May 23, 1933.  M. MORTENSON  1,910,709
ELECTRODE FOR GEOPHYSICAL SURVEYS
Filed Jan. 9, 1929
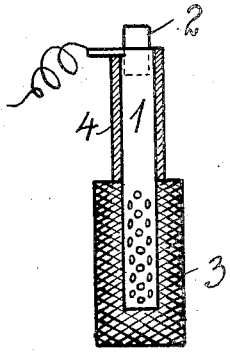
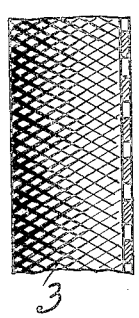
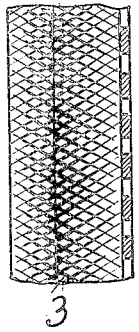
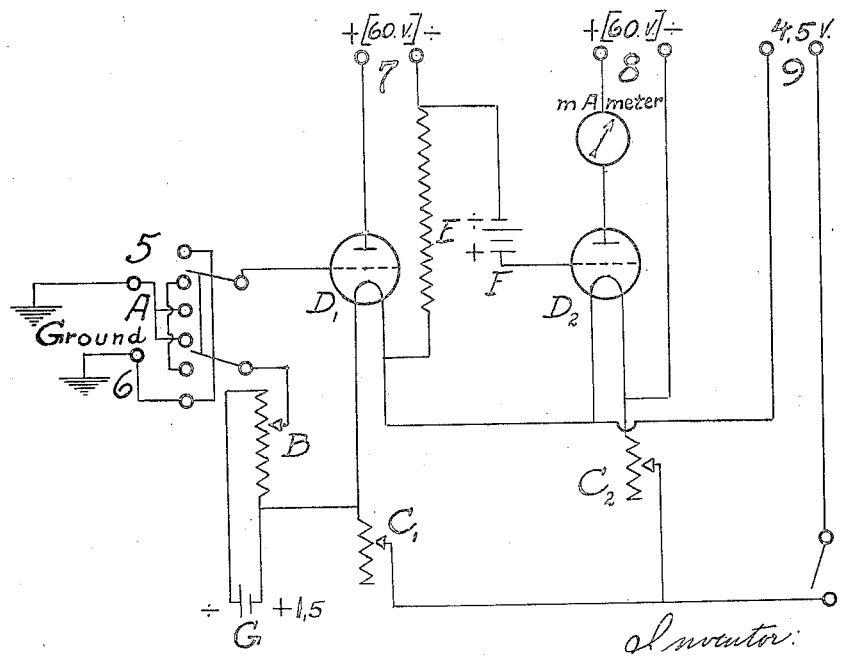

Patented May 23, 1933

1,910,709

UNITED STATES PATENT OFFICE

MAGNE MORTENSON, OF TRONDHJEM, NORWAY

ELECTRODE FOR GEOPHYSICAL SURVEYS

Application filed January 9, 1929, Serial No. 331,258, and in Norway January 12, 1928.

It is previously known that several ore-containing rocks have electric potentials which can be utilized for the purpose of finding or locating the ore.

One of the main difficulties, when undertaking such survey, is to prevent that the electrodes which are used for connecting the measuring-apparatus to the ground, become polarized. It has been tried to remedy this difficulty by using electrodes, consisting of a metal rod in a porous cylinder, said cylinder being filled with a salt solution, containing said metal.

The present invention relates to electrodes of this class, and its purpose is to provide an electrode, the construction of which comprises several advantages with respect to the already known types of electrodes.

One object of this invention is to provide an electrode where the metallic core is surrounded by a porous container, the porosity of which in steps or gradually decreases from the metal core to the outside of the container.

Preferably, the metallic core consists of a hollow perforated metal cylinder, filled with a saturated salt solution of the same metal (for example zinc or copper). Very good results may be obtained when a hygroscopic salt is used.

The porous container can be made in one piece of the same kind of material or consist of several pieces of different materials.

With such a construction the amount of electrolyte per cubic unit volume will decrease in the container from the inside to the outside; at the same time the electrode will have a mechanically solid construction.

The details of construction of the electrodes can of course be varied to a great extent, depending on its field of application.

The invention is illustrated in the annexed drawing as an example only.

Fig. 1 is a view, diagrammatically illustrating an electrode, adapted for ore survey according to the invention.

Fig. 2 is a section through a broken-away piece of the porous container.

Fig. 3 is a view similar to Fig. 2, but of a modified embodiment of the invention.

Fig. 4 shows a diagram of connections for a measuring apparatus.

In the drawing, Fig. 1, 1 is a perforated cylindrical hollow metal core, the upper end of which is closed by means of a cork or the like 2. The porous container 3 encircles the lower part of the metal core, while its upper part is covered by some insulating material 4.

In Fig. 2 the container is shown, consisting of a material, whose porosity decreases through its entire cross section.

In Fig. 3 the container consists of two separate parts, of which the outside one has increasing porosity towards the outside, while the inside one has increasing porosity in the other direction.

An arrangement as above described may preferably be used for given types of measurements.

The porous material can be manufactured from a number of different materials, among which may be mentioned clay, carborundum, plaster of Paris, and other solid electrolytes or half-conducting materials. The decreasing, respectively the increasing porosity of the container may be obtained for instance by building the container from layers of grainy material with differently sized grains. These layers may be loosely packed together or separated by means of separating walls of some porous material, or the grains of the separate layers may be moulded together, for instance by means of adding a special pitch or by burning.

The principal use of the above described electrodes is for geo-physical surveys in general, but they can also be used for other purposes, for instance in electrolytical processes.

When using these electrodes for electrical measurements, as for instance in connection with electrical ore-searching, any previously known method can be used.

For best results, the measuring instruments which are being used, should not extract any energy from the field between the electrodes.

One instrument which is used and which to some extent will fulfill this requirement, is the compensating potentiometer. But even a compensating instrument requires some current when being adjusted. For this reason, this type of instrument is not without influence on the polarization.

A measuring apparatus which will work without consumption of energy can be constructed by using one or more steps of audion-tube-voltmeters, where the grid of the first tube is given a proper negative potential to prevent any grid current from flowing.

In Fig. 4 is shown a diagram-connection for an audion voltmeter of this type.

In this figure A represents a switch, whose terminals 5 and 6 by means of proper connections are connected to electrodes, which can be grounded.

B represents a potentiometer, adapted to control the electric energy from the battery G (1.5 volt) in such a manner that the grid in the audion tube $D_1$ will be given a proper negative potential.

$C_1$ and $C_2$ are rheostats, adapted to regulate the filament current through $D_1$ and $D_2$.

E is the anode resistance for connecting the second tube $D_2$. F is the grid battery.

The anode batteries are connected at 7 and 8, the potential is 60 volts. At 9 the filament battery is connected with a potential of 4.5 volts.

I claim:—

1. An electrode for electrical measurements or the like comprising a porous container, the porosity of which decreases from the interior towards the exterior, a solution of a metal salt in said container, and a metal member mounted in said solution.

2. An electrode for electrical measurements or the like comprising a porous container, the porosity of which decreases from the interior towards the exterior, the said porous container consisting of at least one solid electrolyte formed of material which has a depolarizing effect on the electrodes, a solution of metal salt contained in said container, and a metal part comprising a perforated cylinder mounted in said container and adapted to be filled with the said solution.

3. An electrode for electrical measurements or the like comprising a porous container consisting of at least one solid electrolyte arranged in such manner that the porosity thereof is at a minimum at a point within the container wall and increases gradually towards the surfaces of the said wall, a solution of a metal salt contained in said container, and a metal part comprising a perforated cylinder mounted in said container and adapted to be filled with the said solution.

4. Electrode for electrical measurements and other purposes, especially for geo-physical survey, consisting of a metal part, surrounded by a porous container or the like, which contains a solution of a metal salt, the porosity of said container decreasing from the inside towards the outside, thereby eliminating potentials due to polarization by preventing the appearance of uneven changes in the electrolyte concentration within the electrode.

5. Electrode for electrical measurements and other purposes, especially for geo-physical surveys, consisting of a metal part, surrounded by a porous container or the like, containing a solution of a metal salt, said metal part consisting of a perforated cylinder, adapted to be filled with the electrolyte, and said porous container consisting of one or more solid electrolytes, the porosity of said container decreasing from the inside towards the outside, thereby eliminating potentials due to polarization by preventing the appearance of uneven changes in the electrolyte concentration within the electrode.

6. Electrode for electrical measurements and other purposes, especially for geo-physical surveys, consisting of a metal part, surrounded by a porous container or the like, containing a solution of a metal salt, said metal part consisting of a perforated cylinder, adapted to be filled with the electrolyte, and said porous container consisting of one or more solid electrolytes, the porosity of said container decreasing from the inside towards some point within the container wall, from where the porosity will increase towards the outside surface, thereby eliminating potentials due to polarization by preventing the appearance of uneven changes in the electrolyte concentration within the electrode.

7. The combination of an electrode for electrical measurements, and other purposes, especially for geo-physical survey, consisting of a metal part, surrounded by a porous container or the like, which contains a solution of a metal salt, the porosity of said container decreasing from the inside towards the outside, thereby eliminating potentials due to polarization by preventing the appearance of uneven changes in the electrolyte concentration within the electrode, with a measuring system, comprising an audion-tube, and connections for separately connecting either of the electrodes of a source of grid bias to the grid of the audion so that there will be no direct connection between the electrodes.

8. A measuring system comprising electrodes for electrical measurements for geophysical survey, consisting of a metal part, surrounded by a porous container or the like, which contains a solution of a metal salt, the porosity of said container decreasing from the inside towards the outside, audion-tubes, and connections for separately connecting either of the electrodes or a source of grid bias to the grid of the first audion, to influence the passage of current through the tubes in such a way that no current can flow from one electrode directly to another, all for the purpose of providing a system where polarization of the electrodes will not take place.

9. A measuring system comprising electrodes for elctrical measurements and other purposes, especially for geo-physical survey, consisting of a metal part, surrounded by a porous container or the like, containing a solution of a metal salt, said metal part consisting of a perforated cylinder, adapted to be filled with the elctrolyte, and said porous container consisting of one or more solid electrolytes, the porosity of said container decreasing from the inside towards the outside, audion-tubes, and connections for separately connecting either of the electrodes or a source of grid bias to the grid of the first audion to influence the passage of current through the tubes in such a way that no current can flow from one elctrode directly to another, all for the purpose of providing a system where polarization of the electrodes will not take place.

10. A measuring system, comprising electrodes for electrical measurements and other purposes, especially for geo-physical survey, consisting of a metal part, surrounded by a porous container or the like, containing a solution of a metal salt, said metal part consisting of a perforated cylinder, adapted to be filled with the electrolyte, and said porous container consisting of one or more solid electrolytes, the porosity of said container decreasing from the inside towards some point within the container wall, from where the porosity will increase towards the outside surface, audion-tubes, and connections for separately connecting either of the electrodes or a source of grid bias to the grid of the first audion, to influence the passage of current through the tubes in such a way that no current can flow from one electrode directly to another, all for the purpose of providing a system, where polarization of the electrodes will not take place.

In testimony whereof I have signed my name unto this specification.

MAGNE MORTENSON.